United States Patent
Schlosser et al.

(10) Patent No.: US 6,275,509 B1
(45) Date of Patent: Aug. 14, 2001

(54) MASKED SIGNAL TRANSCEIVER

(75) Inventors: Thomas W. Schlosser; James W. Bond, both of San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/079,074

(22) Filed: May 14, 1998

(51) Int. Cl.[7] .................................................. H04J 3/12
(52) U.S. Cl. ........................ 370/527; 370/529; 370/320; 370/326; 370/336; 370/342; 370/343; 380/6
(58) Field of Search .................. 370/527, 529, 370/320, 326, 336, 342, 343; 380/6

(56) References Cited

U.S. PATENT DOCUMENTS

| | | |
|---|---|---|
| 3,612,770 | 10/1971 | Zegers . |
| 3,666,889 | 5/1972 | Zegers et al. . |
| 3,949,171 | 4/1976 | Painter . |
| 4,075,566 * | 2/1978 | D'Arcangelis . |
| 4,495,620 | 1/1985 | Steele et al. . |
| 4,763,326 | 8/1988 | Krick . |
| 5,099,478 | 3/1992 | Bremer et al. . |
| 5,243,622 * | 9/1993 | Lux et al. ................................. 375/1 |
| 5,280,537 | 1/1994 | Suglyama et al. . |
| 5,289,194 * | 2/1994 | Schlosser ............................. 342/378 |
| 5,412,686 * | 5/1995 | Ling ..................................... 375/200 |
| 5,495,468 * | 2/1996 | Leveque .................................. 370/7 |
| 5,696,789 * | 12/1997 | Jones et al. .......................... 375/200 |
| 5,757,854 * | 5/1998 | Hunsinger et al. .................. 375/260 |
| 5,822,360 * | 10/1998 | Lee et al. .............................. 375/200 |
| 5,881,047 * | 3/1999 | Bremer et al. ....................... 370/207 |

* cited by examiner

Primary Examiner—Hassan Kizou
Assistant Examiner—Thien Tran
(74) Attorney, Agent, or Firm—Harvey Fendelman; Michael A. Kagan; Eric James Whitesell

(57) ABSTRACT

A masked signal transceiver of the present invention comprises a transmitter for transmitting a combined signal of a primary communications signal and an attenuated secondary communications signal occupying substantially the same frequency band concurrently. A receiver receives the combined signal and demodulates the primary communications signal to extract the primary communications signal information. An adaptive locally optimum processor separates the secondary communications signal from the combined signal. The secondary communications signal is then demodulated to extract the secondary communications signal information.

5 Claims, 2 Drawing Sheets

MASKED SIGNAL TRANSCEIVER

LICENSING INFORMATION

The invention described below is assigned to the United States Government and is available for licensing commercially. Technical and licensing inquiries may be directed to Harvey Fendelman, Legal Counsel For Patents, Space and Naval Warfare Systems Center D0012, 53510 Silvergate Avenue, San Diego, Calif. 92152; telephone no. (619)553-3001; fax no. (619)553-3821.

BACKGROUND OF THE INVENTION

The present invention relates to using a single communications channel for multiple concurrent transmissions. More specifically, but without limitation thereto, the present invention relates to a device for combining concurrent communications signals in the same frequency band, transmitting the combined signal to a remote receiver, and separating the combined signal into replicas of the concurrent communications signals.

One of the problems facing the rapidly growing telecommunications industry is the high number of communications signals required to fit into a limited frequency bandwidth. It is also desirable in some applications to conceal the fact that a certain signal is being transmitted. One way to conceal a signal is to mask it with another signal in the same frequency band, but then the problem arises of recovering the masked signal without losing information due to the presence of the masking signal.

A continued need exists for a device that can combine concurrent communications signals into the same frequency channel to conserve the available bandwidth and be able to recover the signals without losing their information.

SUMMARY OF THE INVENTION

A masked signal transceiver of the present invention is directed to overcoming the problems described above, and may provide further related advantages. No embodiment of the present invention described herein shall preclude other embodiments or advantages that may exist or become obvious to those skilled in the art.

A masked signal transceiver of the present invention comprises a transmitter for transmitting a combined signal of a primary communications signal and an attenuated secondary communications signal occupying substantially the same frequency band concurrently. A receiver receives the combined signal and demodulates the primary communications signal to extract the primary communications signal information. An adaptive locally optimum processor separates the secondary communications signal from the combined signal. The secondary communications signal is then demodulated to extract the secondary communications signal information.

An advantage of the masked signal transceiver of the present invention is that two signals may be transmitted concurrently in the same frequency band, reducing the required bandwidth for multiple communications channels.

Another advantage is that the primary communications signal may be received and demodulated by an ordinary radio receiver, while the secondary signal may not, thereby providing a covert means of communication.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

The masked signal transceiver of the present invention transmits and receives a primary communications signal and a secondary communications signal occupying substantially the same frequency band concurrently. For digital radios operating in the lower portion of the radio frequency spectrum (Low Frequency/Very Low Frequency/Extremely Low Frequency), the present invention may be used to increase throughput of a selected channel. Also, the primary signal may be used to communicate with receivers located far from the transmitter, while the secondary signal may be used to transmit to receivers located near to the transmitters. For digital radios operating in the higher portion of the radio frequency spectrum (HF and above), the present invention may be used to conceal the secondary communications signal within the primary communications signal.

Adaptive locally optimum processing techniques have been used to detect a weak signal in the presence of in-band interference using an adaptive locally optimum processor as described in U.S. Pat. No. 5,289,194 titled "COMBINER FOR TWO DIMENSIONAL ADAPTIVE INTERFERENCE SUPPRESSION SYSTEM" issued on Feb. 22, 1994 to Thomas W. Schlosser and incorporated herein by reference thereto. The present invention incorporates an adaptive locally optimum processor, substituting a secondary communications signal for the weak signal and a primary communications signal for the interference. The information in the primary communications signal may be recovered by an ordinary radio receiver, while the information in the secondary signal may be recovered by processing the basebanded signal to reveal the secondary signal and demodulating the secondary signal by standard demodulating techniques.

Figure 1:
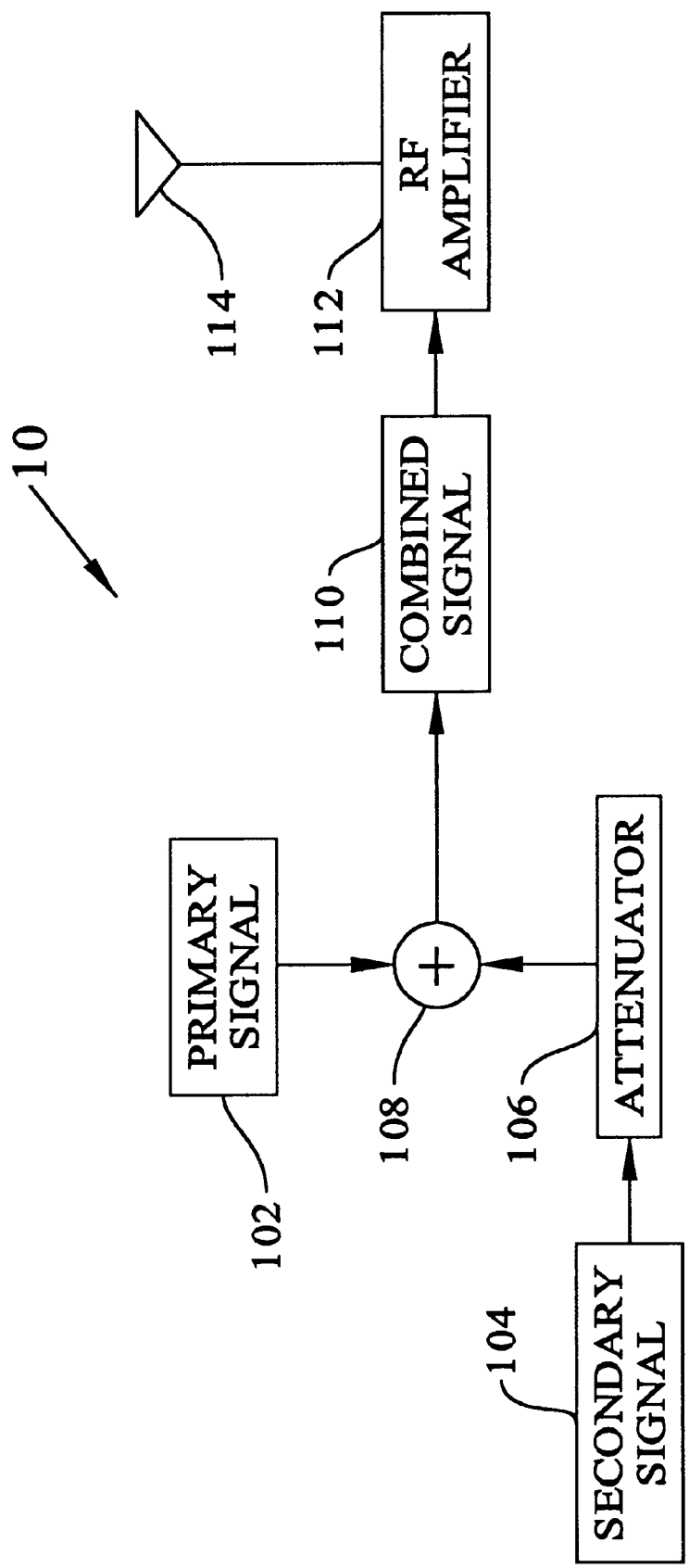
FIG. 1 is a block diagram of a transmitter of the present invention.

FIG. 1 is a block diagram of a transmitter 10 of the present invention. A primary signal 102 comprises a first modulated signal having a bandwidth and a power level generated according to well known techniques. A secondary signal 104 comprises a second modulated signal generated in a similar manner as primary signal 102. An attenuator 106 attenuates the second modulated signal by 10 dB or more. Primary signal 102 and attenuated secondary signal 104 are added by a combiner 108. Combiner 108 may be, for example, a two-line to one-line power combiner. The combined signal 110 may then be broadcast, for example, by an RF amplifier 112 and an antenna 114.

Figure 2:
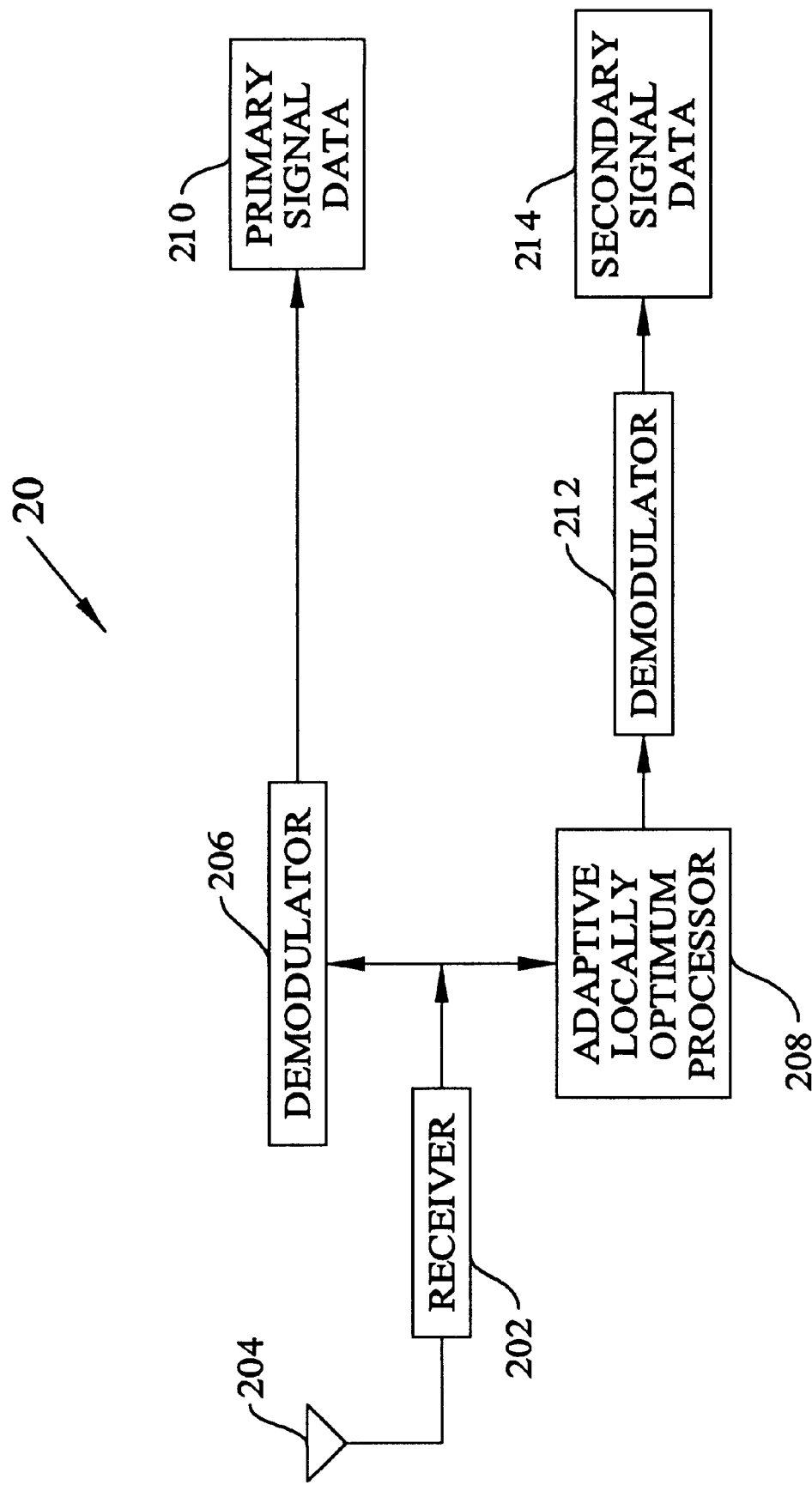
FIG. 2 is a block diagram of a receiver of the present invention.

FIG. 2 is a block diagram of a receiver 20 of the present invention. A standard radio 202 receives the transmitted combined signal 110 from transmitter 10 by, for example, an antenna 204. Radio 202 outputs a replica of combined signal 110 containing a replica of primary signal 102 and secondary signal 104 to a first demodulator 206 and an adaptive locally optimum processor 208. First demodulator 206 demodulates the replica of primary signal 102 and outputs primary signal data 210. Secondary signal 104 is attenuated by 10 dB or more relative to primary signal 102 so that first demodulator 206 may recover the information from the replica of primary signal 102.

Adaptive locally optimum processor 208 inputs the replica of combined signal 110 and removes the replica of primary signal 102 as interference, leaving the replica of secondary signal 104. The replica of secondary signal 104 is output to demodulator 212, which demodulates secondary signal 104 and outputs secondary signal data 214.

The primary communications signal is preferably a constant amplitude and/or linear phase, such as FM and FSK. The secondary communications signal is preferably a 6 dB or more direct spreading sequence attenuated by about 10 dB or more relative to the primary communications signal.

Various modifications and variations of the present invention may be possible within the scope of the following claims to practice the invention otherwise than described above.

What is claimed is:

1. A communications system, comprising a transmitter comprising a signal combiner for coupling a primary communications signal and a secondary communications signal to create a combined signal, wherein the primary communications signal and the secondary communications signal occupy substantially the same frequency band concurrently, the primary communications signal is selected from the group that includes a constant amplitude signal and a linear phase modulated signal, and the secondary communications signal is a direct sequence spreading signal;

a receiver for receiving the combined signal comprising an adaptive locally optimum processor for separating the secondary communications signal from the primary communications signal; and an attenuator coupled to the signal combiner for attenuating the secondary communications signal.

2. The communications system of claim 1 wherein the attenuator provides an attenuation of about 10 dB.

3. The communications system of claim 1 wherein the attenuator provides an attenuation greater than 10 dB.

4. The communications system of claim 1 wherein the receiver generates a replica signal in response to detecting the combined signal, where the replica signal includes a first component signal representing the primary signal, and a second component signal representing the secondary signal.

5. The communications system of claim 4 further comprising a demodulator coupled to the receiver amplifier for demodulating the first component signal from the replica signal.

* * * * *